(12) United States Patent
Hundemer

(10) Patent No.: US 9,357,067 B2
(45) Date of Patent: May 31, 2016

(54) SYSTEMS AND METHODS FOR USING CALLER DATA TO ELECTRONICALLY DISSEMINATE A MESSAGE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

(*) Notice: Subject to any disclaimer, the term of this patent is extended or adjusted under 35 U.S.C. 154(b) by 477 days.

(21) Appl. No.: 13/691,287

(22) Filed: Nov. 30, 2012

(65) Prior Publication Data

US 2014/0153704 A1    Jun. 5, 2014

(51) Int. Cl.
| H04M 1/64 | (2006.01) |
| H04M 3/487 | (2006.01) |
| H04M 3/537 | (2006.01) |
| H04M 7/00 | (2006.01) |
| H04M 3/42 | (2006.01) |

(52) U.S. Cl.
CPC .............. *H04M 3/487* (2013.01); *H04M 3/537* (2013.01); *H04M 7/0042* (2013.01); *H04M 7/0054* (2013.01); *H04M 3/42059* (2013.01); *H04M 2203/651* (2013.01)

(58) Field of Classification Search
USPC ....................................................... 379/88.12
See application file for complete search history.

(56) References Cited

U.S. PATENT DOCUMENTS

| 4,356,348 | A | * | 10/1982 | Smith | H04M 3/2272 |
| | | | | | 379/32.04 |
| 4,539,436 | A | * | 9/1985 | Theis | H04M 3/42221 |
| | | | | | 360/12 |
| 4,667,065 | A | * | 5/1987 | Bangerter | H04M 1/82 |
| | | | | | 379/351 |
| 4,692,817 | A | * | 9/1987 | Theis | H04M 3/42221 |
| | | | | | 360/12 |
| 4,941,168 | A | * | 7/1990 | Kelly, Jr. | H04M 1/27 |
| | | | | | 379/69 |
| 5,371,787 | A | * | 12/1994 | Hamilton | H04M 1/654 |
| | | | | | 379/216.01 |
| 5,404,400 | A | * | 4/1995 | Hamilton | H04M 3/46 |
| | | | | | 379/172 |
| 5,430,792 | A | * | 7/1995 | Jesurum | H04M 3/46 |
| | | | | | 379/265.02 |
| 5,444,767 | A | * | 8/1995 | Goetcheus | H04M 1/642 |
| | | | | | 206/232 |

(Continued)

OTHER PUBLICATIONS

Wikipedia, For-profit education, Jun. 1, 2015, 1 page.*

*Primary Examiner* — Joseph T Phan
(74) *Attorney, Agent, or Firm* — McDonnell Boehnen Hulbert & Berghoff LLP

(57) ABSTRACT

Disclosed herein are systems and methods for using caller data to electronically disseminate a message. In one aspect, a method involves (i) a phone switch receiving a phone call and corresponding caller data, (ii) the phone switch sending to a record manager, the caller data, (iii) the record manager receiving the sent caller data, and (iv) responsive to the record manager receiving the sent caller data, the record manager (a) retrieving from a data storage, a school identifier corresponding to the received caller data, and (b) causing a notification system to electronically disseminate a message, wherein the message indicates that an updated operational-status of a school identified by the retrieved school identifier is expected soon.

20 Claims, 7 Drawing Sheets

(56) References Cited

U.S. PATENT DOCUMENTS

| | | | | |
|---|---|---|---|---|
| 5,559,867 A * | 9/1996 | Langsenkamp | H04M 3/02 | 379/355.1 |
| 5,581,602 A * | 12/1996 | Szlam | H04M 3/51 | 379/196 |
| 5,644,624 A * | 7/1997 | Caldwell | H04M 1/274575 | 379/209.01 |
| 5,644,625 A * | 7/1997 | Solot | H04M 3/533 | 358/440 |
| 5,652,784 A * | 7/1997 | Blen | H04M 3/42017 | 379/246 |
| 5,724,420 A * | 3/1998 | Torgrim | H04M 3/5158 | 379/265.07 |
| 5,768,358 A * | 6/1998 | Venier | H04M 3/533 | 379/221.09 |
| 5,787,151 A * | 7/1998 | Nakatsu | H04M 3/533 | 379/88.04 |
| 5,790,019 A * | 8/1998 | Edwin | G08B 7/06 | 340/286.02 |
| 5,799,066 A * | 8/1998 | Joyce | H04M 3/533 | 379/88.04 |
| 5,901,214 A * | 5/1999 | Shaffer | H04M 3/4228 | 379/207.12 |
| 5,917,887 A * | 6/1999 | Fesler | G08B 25/016 | 379/48 |
| 5,943,410 A * | 8/1999 | Shaffer | G06F 17/30899 | 379/213.01 |
| 6,002,748 A * | 12/1999 | Leichner | H04M 11/045 | 340/601 |
| 6,021,177 A * | 2/2000 | Allport | H04M 1/27 | 379/42 |
| 6,067,348 A * | 5/2000 | Hibbeler | H04M 3/42 | 379/67.1 |
| 6,121,885 A * | 9/2000 | Masone | G08B 17/10 | 340/286.05 |
| 6,345,250 B1 * | 2/2002 | Martin | H04M 3/4936 | 379/88.16 |
| 6,404,880 B1 * | 6/2002 | Stevens | H04L 29/06 | 379/201.12 |
| 6,452,492 B1 * | 9/2002 | Drury | G08B 27/001 | 340/505 |
| 6,678,358 B2 * | 1/2004 | Langsenkamp | H04M 3/46 | 379/33 |
| 6,745,021 B1 * | 6/2004 | Stevens | H04M 3/42 | 455/404.1 |
| 6,912,270 B1 * | 6/2005 | Drury | H04M 11/045 | 379/40 |
| 7,174,005 B1 * | 2/2007 | Rodkey | H04L 12/1895 | 379/252 |
| 7,609,819 B1 * | 10/2009 | Tuttle | | 379/40 |
| 7,684,548 B1 * | 3/2010 | Rodkey | H04L 12/1895 | 379/221.11 |
| 8,519,860 B2 * | 8/2013 | Johnson | G08B 27/006 | 340/500 |
| 9,024,786 B1 * | 5/2015 | Jones | G01W 1/02 | 340/905 |
| 9,077,779 B2 * | 7/2015 | Lesser | H04L 67/42 | |
| 9,084,101 B2 * | 7/2015 | Karnalkar | H04M 3/53375 | |
| 9,232,040 B2 * | 1/2016 | Barash | G08B 21/0211 | |
| 2010/0076968 A1 | 3/2010 | Boyns | | |

\* cited by examiner

SYSTEMS AND METHODS FOR USING CALLER DATA TO ELECTRONICALLY DISSEMINATE A MESSAGE

USAGE AND TERMINOLOGY

Throughout this application, unless otherwise specified or unless the context clearly dictates otherwise, "a" or "an" is meant to read as "at least one," and "the" is meant to read as "the at least one."

TECHNICAL FIELD

The disclosed systems and methods relate generally to phone and broadcasting technologies.

BACKGROUND

A location-based organization (LBO) is an organization that generally operates out of a physical location, and that generally relies on the presence of people at that location to facilitate its operation. At any given time, an LBO has an operational status such as open or closed. When an LBO is open, the LBO generally expects select people to travel to and attend the LBO to facilitate its operation. When an LBO is closed, the LBO generally does not expect, and may even discourage people from traveling to and attending the LBO. Typically, an LBO maintains a schedule indicating when the LBO is expected to be open or closed. However, in some instances the LBO may decide to deviate from this schedule and change its operational status with little or no notice.

An example of an LBO is a school. Generally, a school relies on the presence of staff and students to facilitate its operation of educating students. Typically, a school maintains a schedule indicating on which days the school is expected to be open (commonly referred to as "school days"), and on which days the school is expected to be closed. As such, on any given school day, most of its staff and students are likely to travel to and attend the school. However, as discussed above, in some instances, a school may deviate from its schedule. For example, in response to weather conditions (e.g., a severe snowstorm), as a safety precaution the school may close on a day that it was otherwise expected to be open. The school may then cause dissemination of a message, which indicates the school's closed operational-status. The school may cause the message to be disseminated with the intent that targeted recipients (e.g., the staff and students) receive the message and as a result, refrain from traveling to the school. For example, the school may initiate a phone tree to disseminate the message or may provide the closed operational-status to a news organization that may in turn, disseminate such a message, such as via television-broadcast.

SUMMARY

In one aspect, a method involves (i) a phone switch receiving a phone call and corresponding caller data, (ii) the phone switch sending to a record manager, the caller data, (iii) the record manager receiving the sent caller data, and (iv) responsive to the record manager receiving the sent caller data, the record manager (a) retrieving from a data storage, a school identifier corresponding to the received caller data, and (b) causing a notification system to electronically disseminate a message, wherein the message indicates that an updated operational-status of a school identified by the retrieved school identifier is expected soon.

In another aspect, a method involves (i) receiving caller data corresponding to a phone call, and (ii) responsive to receiving the caller data, (a) retrieving from a data storage, a school identifier corresponding to the received caller data, and (b) causing a notification system to electronically disseminate a message, wherein the message indicates that an updated operational-status of a school identified by the retrieved school identifier is expected soon.

In another aspect, a system includes a phone switch and a record manager. The record manager has a data storage, and is connected to the phone switch and to a notification system. The phone switch is configured for (i) receiving a phone call and corresponding caller data, and (ii) sending the caller data to the record manager. The record manager is configured for (i) receiving the sent caller data, and (ii) responsive to the record manager receiving the sent caller data, (a) retrieving from the data storage, an LBO identifier corresponding to the received caller data, and (b) causing the notification system to electronically disseminate a message.

DETAILED DESCRIPTION OF THE DRAWINGS

I. Overview

Figure 1:
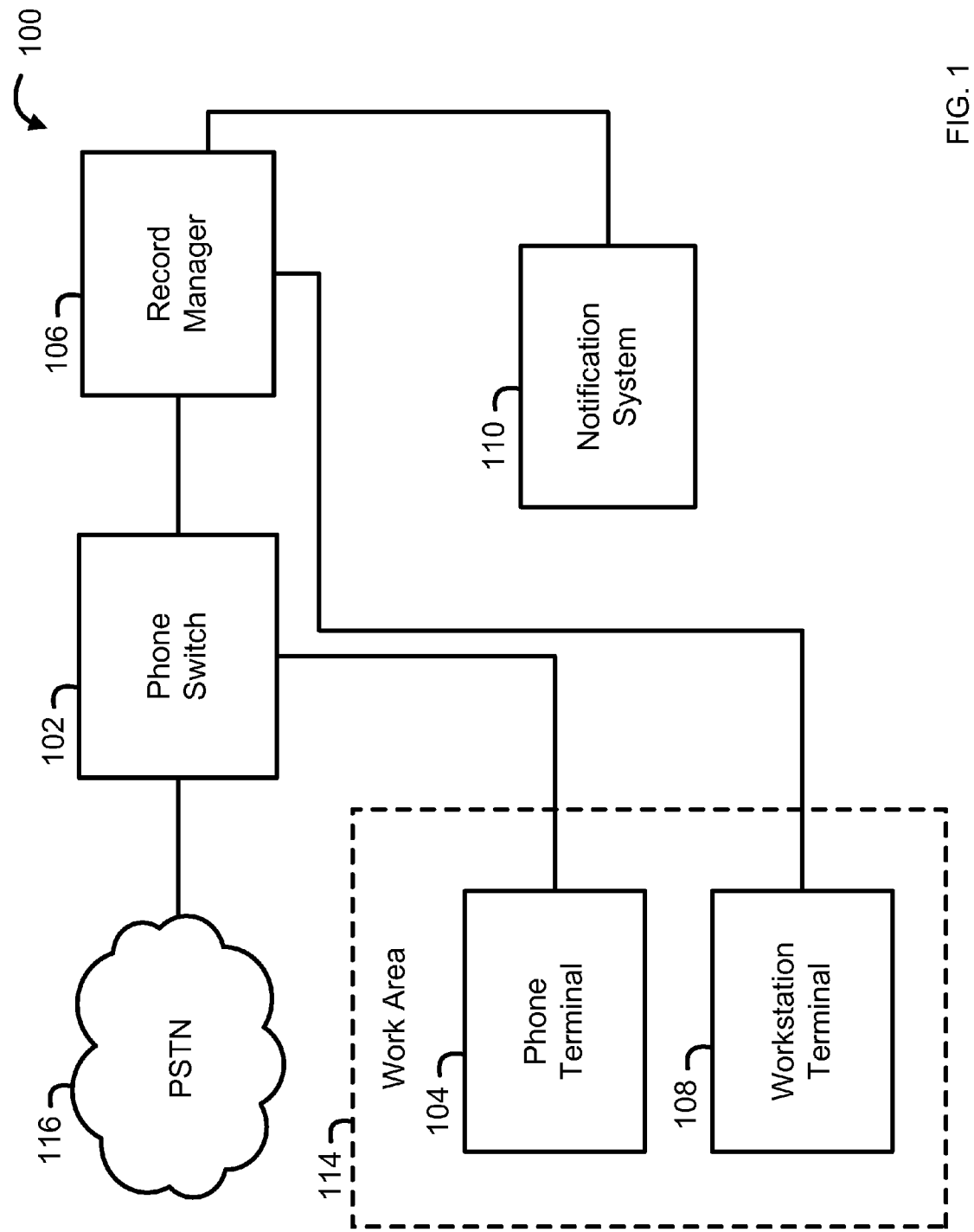
FIG. 1 is a simplified block diagram of an example system.

A school may face a challenging decision in deciding whether to close in response to weather conditions. On one hand, the school has an interest in remaining open to facilitate its operation of educating students. However, on the other hand the school has an interest in promoting the safety of the people who must travel to the school and be exposed to the weather conditions. As such, a school's closing decision involves the balancing of competing interests, and may rely in large part on the nature and/or severity of the weather conditions.

Since weather conditions constantly change, a school may continually monitor such conditions and wait to make a closing decision until shortly before the scheduled start time of the corresponding school day. Particularly in these instances, the school has an interest in quickly and effectively disseminating a message indicating that the school is closed so that the intended recipients may receive the message before traveling to the school.

As noted above, one way in which a school may cause dissemination of a message indicating that the school is closed is with the assistance of a news organization. In this instance, a person who is authorized to change the operational status of the school (referred to herein as a "school administrator"), such as a principle or superintendent, may make a phone call to a designated recipient (referred to herein as an "operator") at the news organization, and provide the operator with the school's closed operational-status. The operator may then store the closed operational status in a computing-device via a user interface. In response, a notification system connected to the computing-device may send a message indicating the operational status of the school to a list of subscribers via email or text message. The notification system may also publish the message on a website. Further in response, the notification system may overlay the message on video being broadcast. Such an overlayed message is commonly referred to as a news ticker or crawl and may, for instance, be used in connection with a television news show.

A news organization also has an interest in disseminating such messages quickly and effectively so as to gain a reputation from the public that the news organization is a reliable source for important, breaking news. Indeed, as with any type of news or related content, a news organization may obtain a competitive edge over another news organization by being the first to disseminate the message.

Schools and news organizations also have an interest in ensuring that a message indicating that a school is closed is disseminated only when properly authorized. Once the message is disseminated to the public, as a practical matter its effect is virtually irreversible. Indeed, once an intended recipient receives the message, that person is likely to make and stick with a decision not to go to the school that day, regardless of whether the school is actually closed. While the school may subsequently disseminate a correction message, the intended recipient may not receive it and/or may simply ignore it given the perceived reasonable reliance on the original message.

An unauthorized dissemination of a message indicating that a school is closed may occur for a variety of reasons. For example, a student may impersonate an administrator of his school, and may call a news organization to improperly indicate a closed operational-status. As another example, if a news organization uses a computing-device to manage the dissemination of messages, a student may infiltrate that system and again improperly cause disseminated of a message. The use of technology to falsify information such as this is often referred to as spoofing.

The disclosed systems and methods address at least some of the issues discussed above. In one example, a record manager receives caller data corresponding to a phone call (e.g., from an administrator who is calling to provide a closed operational-status). In response, the record manager retrieves a school identifier corresponding to the caller data. Further in response, the record manager causes a notification system to disseminate a first message indicating that an updated operational-status of a school identified by the retrieved school identifier is expected soon. At or near the same time, an operator may answer the phone call from the caller. The operator may then verify the identity of the caller as a school administrator who corresponds to the school identifier, receive an operational status from the school administrator, and cause the notification system to electronically disseminate a second message indicating the operational status of the school identified by the retrieved school identifier. Among other things, disseminating the first message helps ensure that the intended recipients of the second message receive the second message as soon as it is disseminated.

II. Example Systems

FIG. 1 shows an example system 100. The system may include several devices, including for example a phone switch 102, a phone terminal 104, a record manager 106, a workstation terminal 108, and a notification system 110.

A. Phone Switch

Generally, the phone switch 102 may function to receive a phone call from one device and send the phone call to another device. The phone switch 102 may also provide additional functionality, such as that described in greater detail below.

Figure 2:
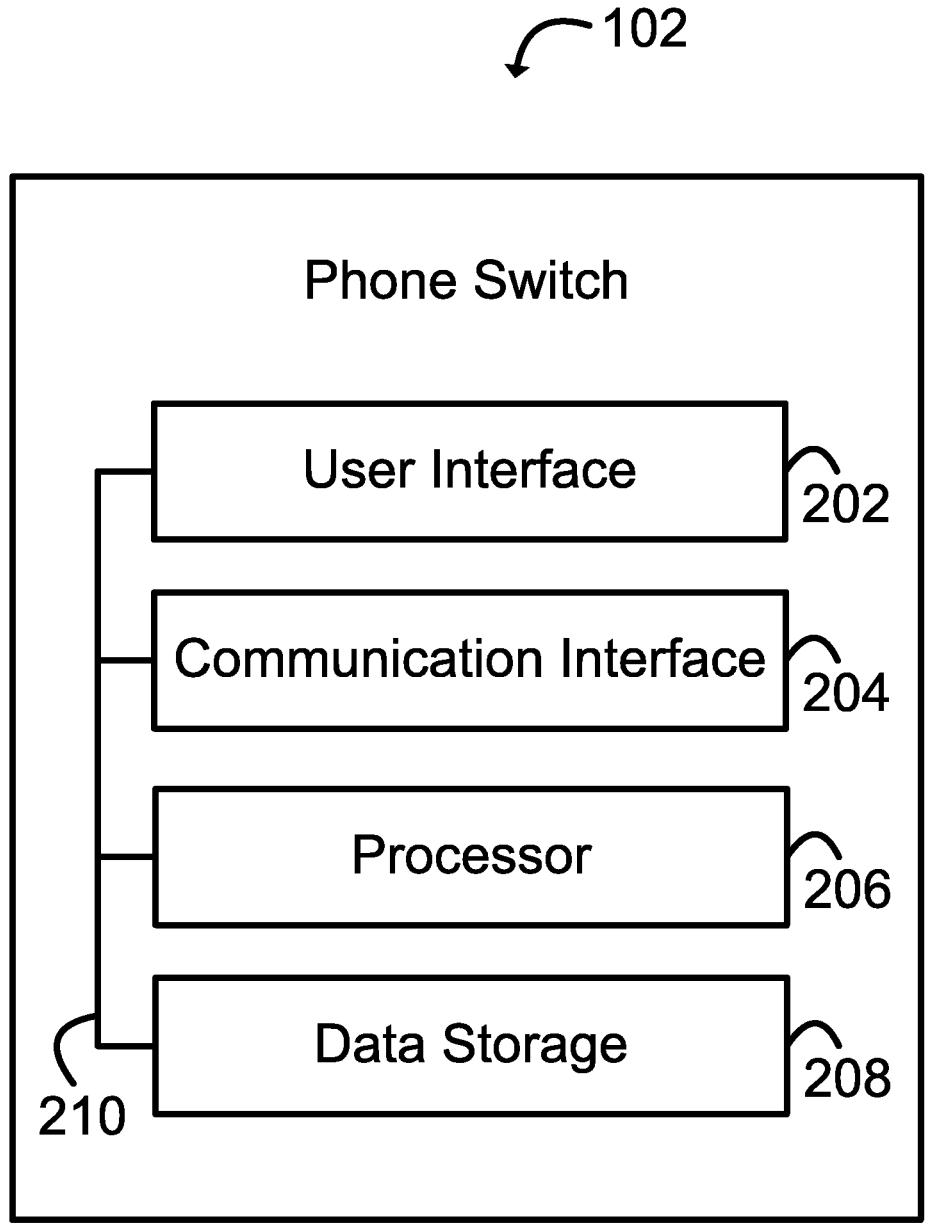
FIG. 2 is a simplified block diagram of an example phone switch of the system of FIG. 1.

FIG. 2 is a block diagram showing example components of the phone switch 102. The phone switch 102 may include a user interface 202, a communication interface 204, a processor 206, and a data storage 208, all of which may be electronically connected to each other via a system bus 210 or other connection mechanism.

The user interface 202 may function to allow the phone switch 102 to interact with a user, such as to receive input from the user or to provide output to the user. The user interface 202 may include input components such as a microphone, keyboard, touch-sensitive or presence-sensitive panel, computer mouse, or trackball. The user interface 202 may also include output components such as a display screen (which, for example, may be integrated with a presence-sensitive panel) or a speaker.

The communication interface 204 may function to allow the phone switch 102 to connect and communicate with other networks and/or devices. The communication interface 204 may include a wired interface or a wireless interface. The wired interface may take various forms, including for example a T1 (also known as a DS1) interface and/or an Ethernet interface. Likewise, the wireless interface may take various forms, including for example, a wireless wide area network (WWAN) interface (e.g., based on the long-term evolution (LTE) protocol), or a wireless local area network (WLAN) interface (e.g., based on the Wi-Fi protocol). Each wireless interface includes a corresponding antenna.

The processor 206 may function to execute program instructions. The processor may include a general purpose processor (e.g., a microprocessor) and/or a special purpose processor (e.g., a digital signal processor (DSP) or an application specific integrated circuit (ASIC)).

The data storage 208 may function to store program instructions and/or other data. The data storage 208 may include a volatile, non-volatile, removable, and/or non-removable storage component, such as magnetic, optical, flash, or organic storage, and may be integrated in whole or in part with processor 206. The data storage 208 may include a non-transitory computer-readable storage medium, having stored thereon program instructions that, upon execution by the processor 206, cause the phone switch 202 or another device to perform any of the functions disclosed herein and/or shown in the accompanying drawings. As such, the phone switch 202 may be configured to perform any of such functions. Program instructions may take various forms, including for example, compiled or non-compiled program logic and/or machine code.

An example phone switch is the Switchvox 355 utilizing the Asterisk software framework, both provided by Digium, Inc. of Huntsville, Ala.

B. Phone Terminal

Generally, the phone terminal 104 may function to receive and answer a phone call for use by an operator, thereby causing the phone call to become active. Generally, the phone terminal 104 may also function to initiate and send a phone call. The phone terminal 104 may also provide additional functionality, such as that described in greater detail below.

As with the phone switch 102, the phone terminal 104 may include a user interface, a communication interface, a processor, and a data storage, all of which may be electronically connected to each other via a system bus or other connection mechanism. Each of these components may be configured to provide functionality similar to that described above in connection with the phone switch 102, except with the functionality corresponding to the phone terminal 104 rather than the phone switch 102.

The phone terminal 104 may take the form of an analog or a digital phone, including for example, a so-called "soft" or "hard" voice over Internet protocol (VOIP) phone, or any other type of communication device configured for use with the phone switch 102. An example phone terminal is the Digium D70 phone provided by Digium, Inc. of Huntsville, Ala.

C. Record Manager

Generally, the record manager 106 may function to receive caller data and retrieve data based on the received caller data. The record manager 106 may also provide additional functionality, such as that described in greater detail below.

Figure 3:
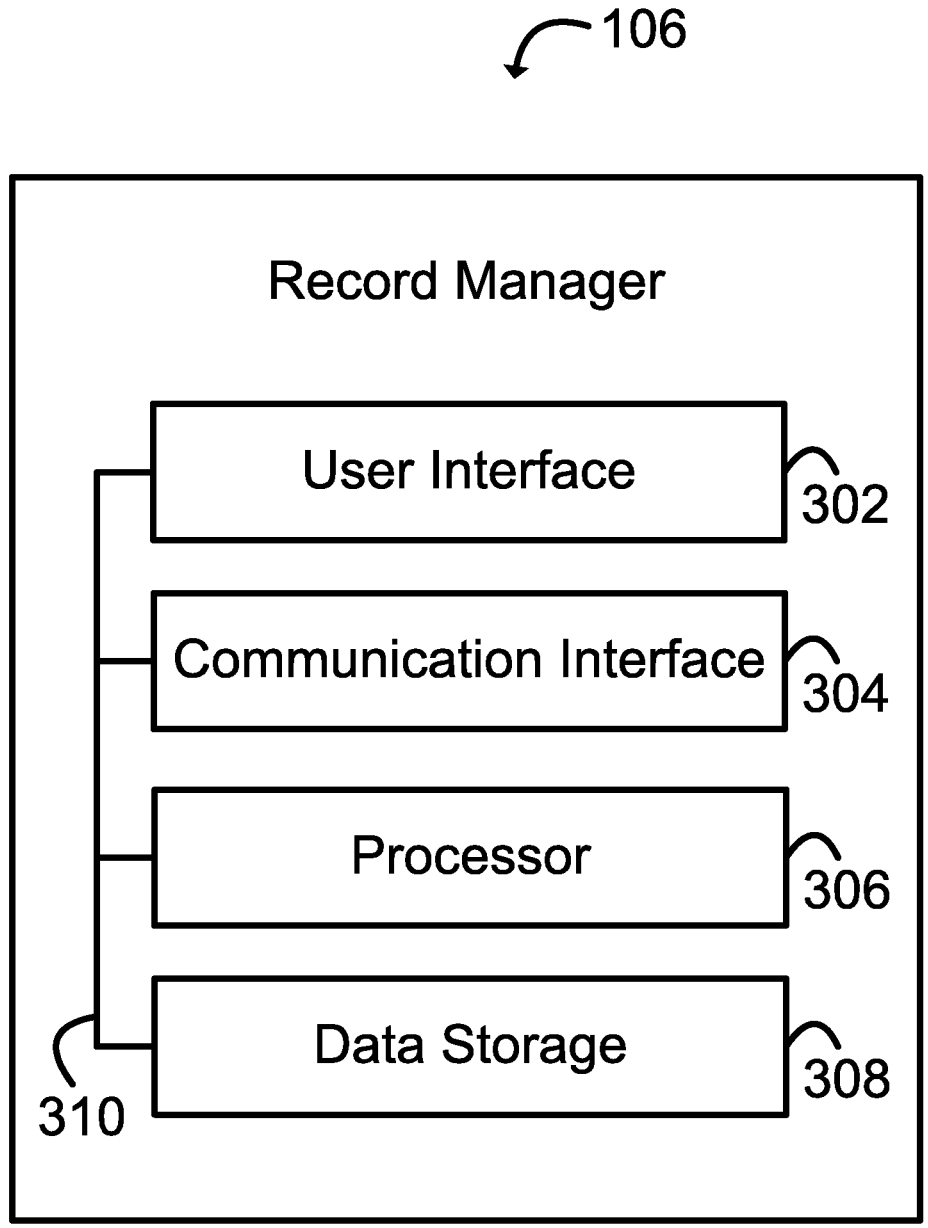
FIG. 3 is a simplified block diagram of an example record manager of the system of FIG. 1.
Figure 4A:
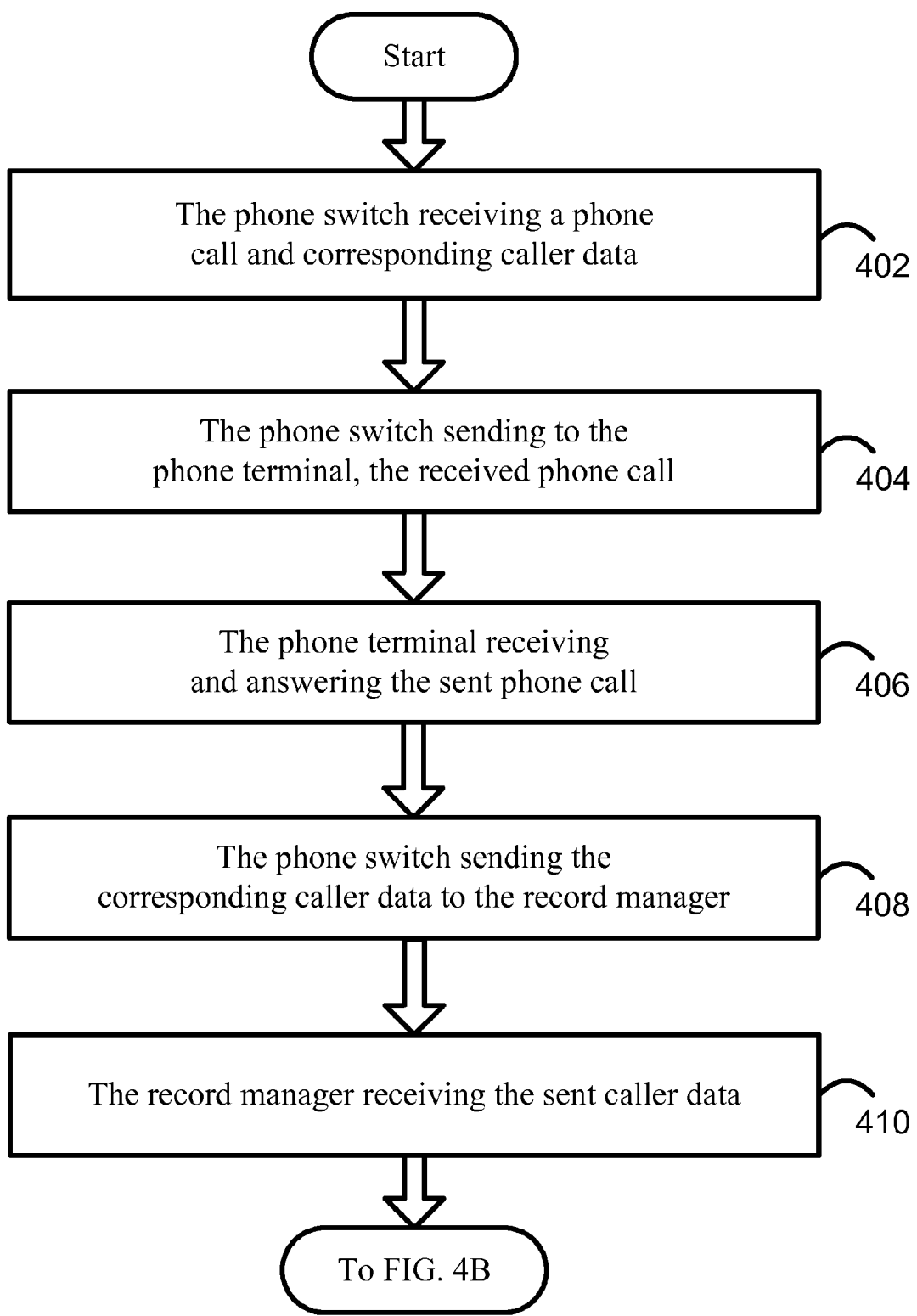
FIG. 4A shows a first part of a flow chart illustrating functions in accordance with an example method.
Figure 4B:
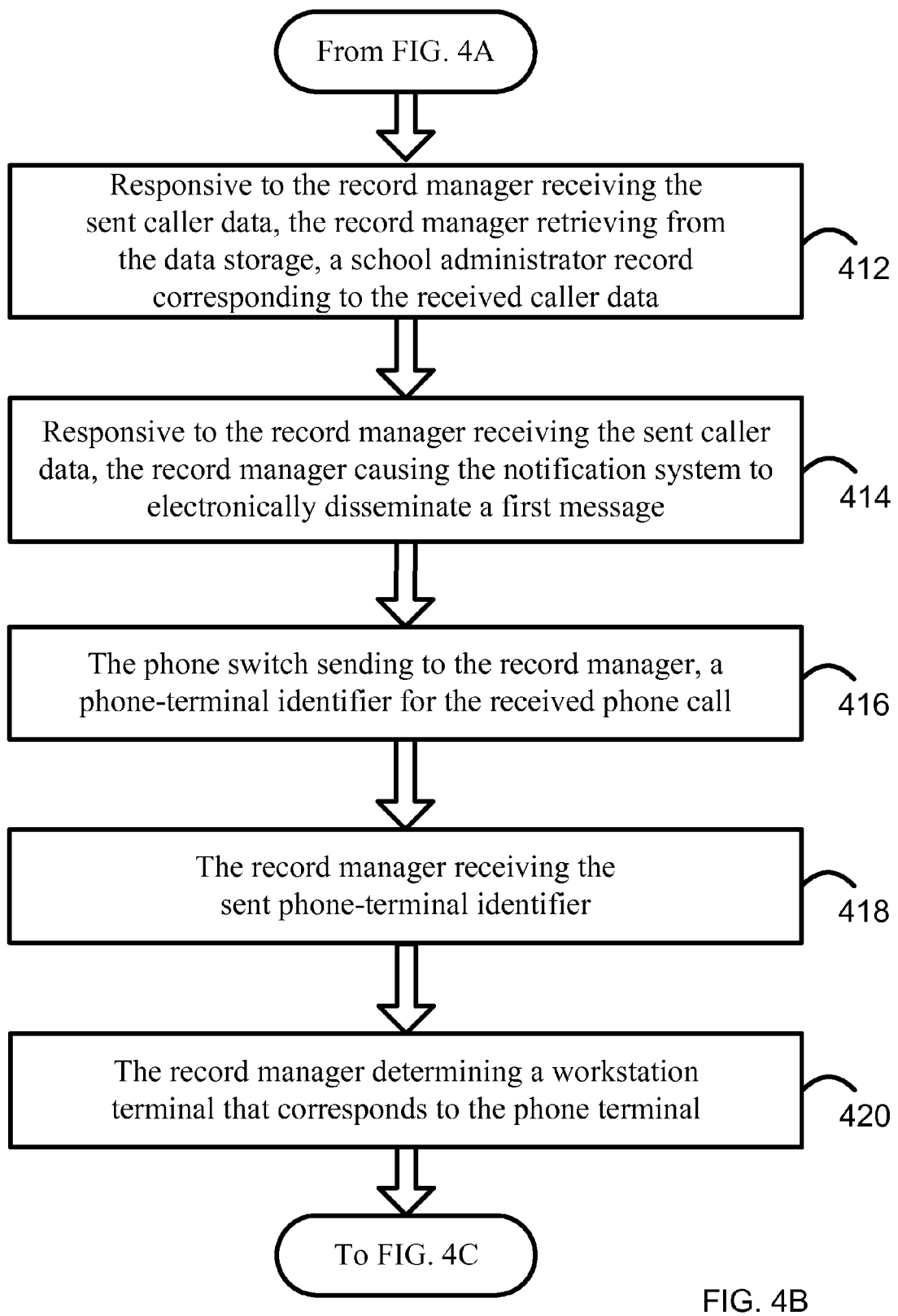
FIG. 4B shows a second part of the flow chart of FIG. 4A.
Figure 4C:
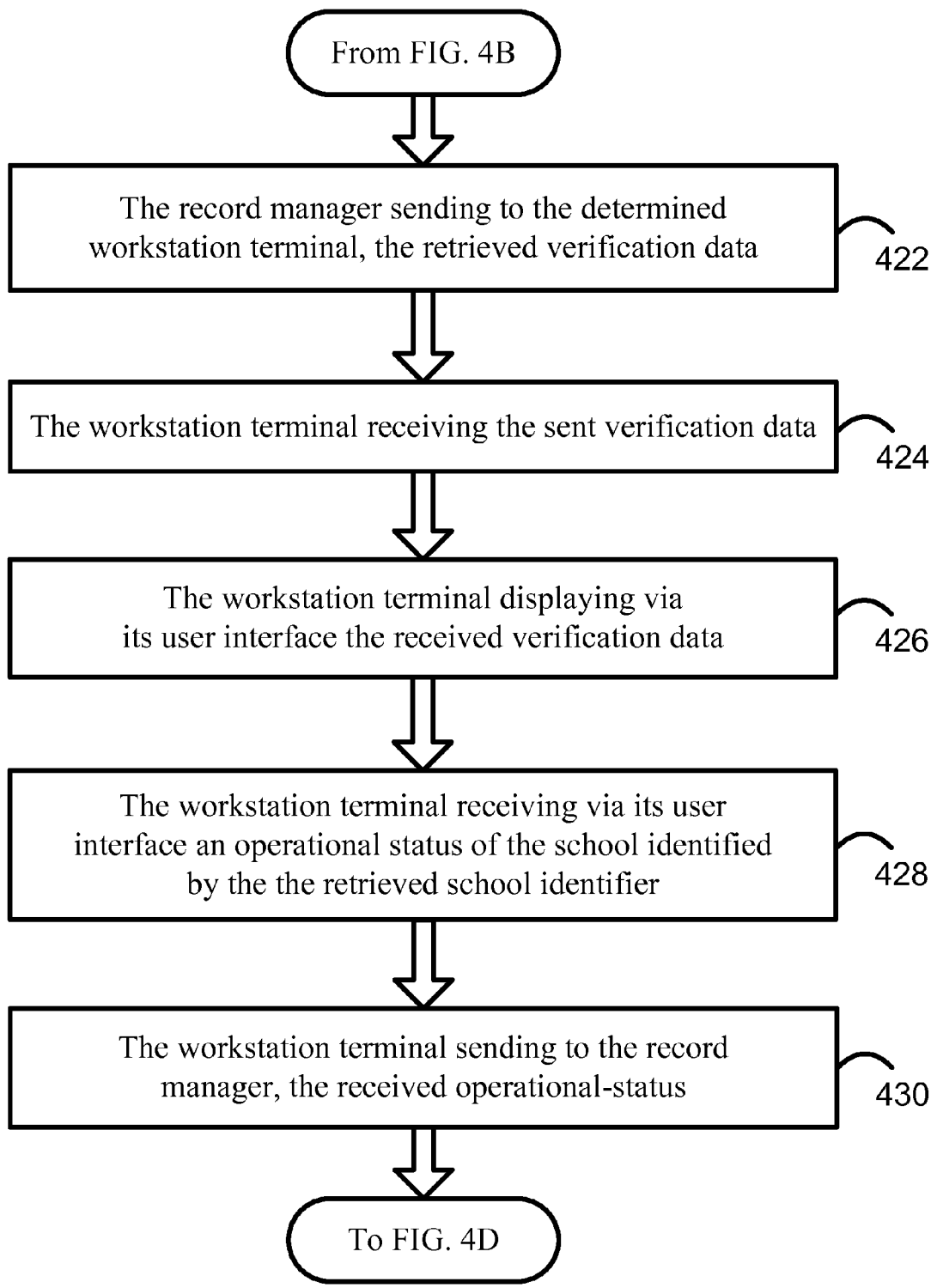
FIG. 4C shows a third part of the flow chart of FIG. 4A.
Figure 4D:
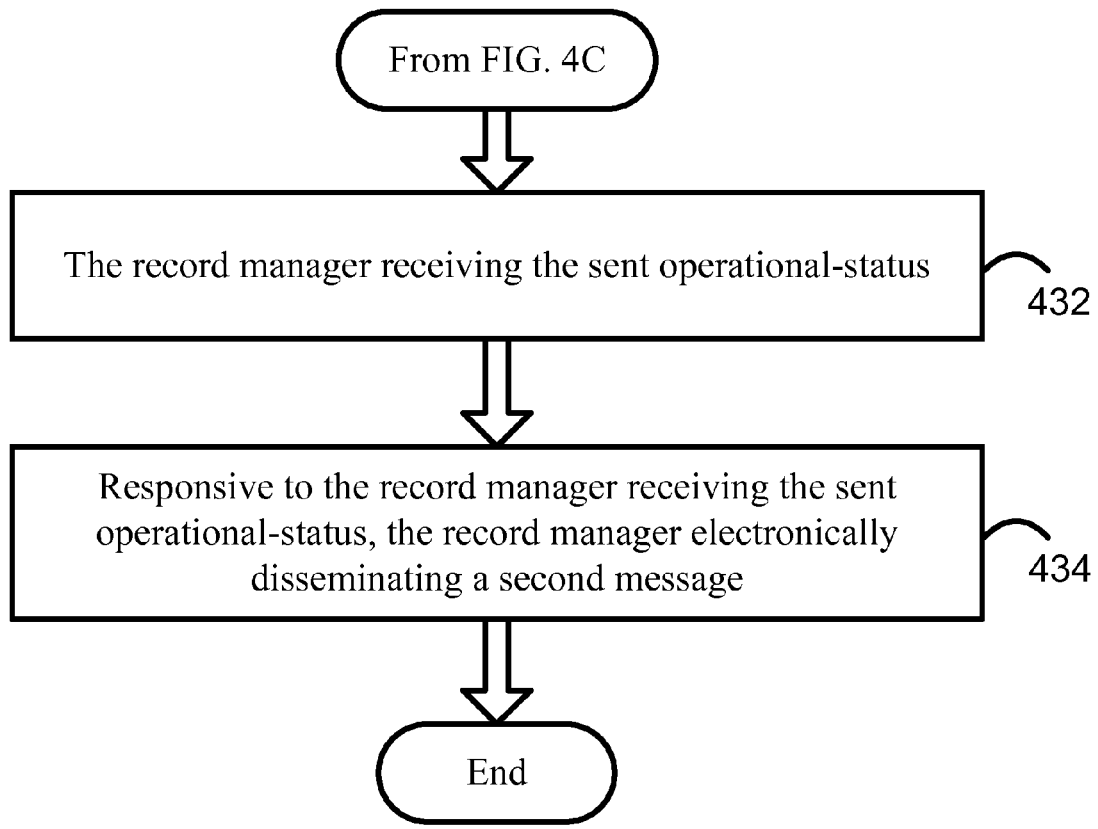
FIG. 4D shows a fourth part of the flow chart of FIG. 4A.

FIG. 3 is a block diagram showing example components of the record manager 106. As with the phone switch 102, the record manager 106 may include a user interface 302, a communication interface 304, a processor 306, and a data storage 308, all of which may be electronically connected to each other via a system bus 310 or other connection mechanism. Each of these components may be configured to provide functionality similar to that described above in connection with the phone switch 102, except with the functionality corresponding to the record manager 106 rather than the phone switch 102.

In one example, the data storage 308 may include a package of hardware and/or software components to implement functionality of the record manager 106, and may include an operating system (e.g., a Windows operating system provided by Microsoft Corporation in Redmond, Wash.), a web server (the Apache HTTP server provided by the Apache Software Foundation of Los Angeles, Calif.), a database (e.g., MySQL provided by Oracle of Redwood Shores, Calif.), and a set of program instructions in the form of scripts based on a scripting language (e.g., the PHP language).

D. Workstation Terminal

Generally, the workstation terminal 108 may function to provide and receive data from a user. The workstation terminal 108 may also provide additional functionality, such as that described in greater detail below.

As with the phone switch 102, the workstation terminal 108 may include a user interface, a communication interface, a processor, and a data storage, all of which may be electronically connected to each other via a system bus or other connection mechanism. Each of these components may be configured to provide functionality similar to that described above in connection with the phone switch 102, except with the functionality corresponding to the workstation terminal 108 rather than the phone switch 102.

In one example, the phone terminal 104 and the workstation terminal 108 may be physically arranged proximate to each other, such as in an office or another work area 114 (e.g., at a news organization) where a single operator may use both the phone terminal 104 and the workstation terminal 108 in unison. For example, this arrangement may allow a user to talk on an active phone call while viewing data via a user interface of the workstation terminal 108. In one example, the workstation terminal 108 may take the form of a desktop or laptop computer.

E. Notification System

Generally, the notification system 110 may function to electronically disseminate messages. For example, the notification system may send a message as an email or a short message service (SMS) text message to a list of subscribers. As another example, the notification system 110 may publish the message on a website. As yet another example, the notification system 110 may overlay the message on video being broadcast. The notification system 110 may also provide additional functionality, such as that described in greater detail below.

As with the phone switch 102, the notification system 110 may include a user interface, a communication interface, a processor, and a data storage, all of which may be electronically connected to each other via a system bus or other connection mechanism. Each of these components may be configured to provide functionality similar to that described above in connection with the phone switch 102, except with the functionality corresponding to the notification system 110 rather than the phone switch 102.

In some instances, such as where the notification system 110 is configured to overlay a message on video being broadcast, the notification system may include additional components. For example, the notification system 110 may include a character generator such as the Viz engine provided by Vizrt in Bergen, Norway or the ChannelBox2 provided by Chyron Corporation.

F. Network and/or Device Connections

As discussed above, each of the devices in the system 100 may include a communication interface for connecting and communicating with other networks and/or devices. As shown in FIG. 1, the phone switch 102 may be connected, such as via a T1 interface to the public-switched telephone network (PSTN) 116. A T1 interfaces may provide for a T1 connection that supports 24 voice channels (each for a different phone call), and a data channel (commonly referred to as a "D-channel") that includes corresponding caller data, among other things, as described in greater detail below.

The phone switch 102 may also be connected to the phone terminal 104 and to the record manager 106, in each instance via respective Ethernet interfaces. Similarly, the record manager 106 may be connected to the workstation terminal 108, and the notification system 110, again in each instance via respective Ethernet interfaces. However, other types of communication interfaces and connection arrangements are possible.

G. Variations

The system 100 described above is just one example of the disclosed systems. Indeed, variations to the system 100 are possible as the described components and devices may be arranged and/or configured in a variety of ways. For example, the phone terminal 104 may take the form of a "soft" VOIP phone that is integrated with the workstation terminal 108. As another example, the phone switch 102 and the record manager 106 may be integrated as a single device.

III. Example Methods

FIGS. 4A-4D show a flow chart illustrating functions in accordance with an example method. At block 402, the method may involve the phone switch 102 receiving a phone call and corresponding caller data. The phone call may be one initiated by a school administrator (or perhaps someone impersonating a school administrator) who dials a designated phone number associated with the phone switch 102. The phone call may therefore be routed through the PSTN 116 to the phone switch 102, and therefore the phone switch 102 may receive the phone call and corresponding caller data from the PSTN 116.

Caller data functions to identify the caller of a phone call, such as by the caller's phone number. Examples of caller data include automatic number identification (ANI) data and caller identification data (commonly referred to as "called ID" data).

At block 404 the method may involve the phone switch 102 sending to the phone terminal 104, the received phone call. Notably, in instances where the phone switch 102 is connected to multiple phone terminals, the phone switch 102 may determine an appropriate phone terminal to send the phone call to by using a priority queue, round-robin, or other determination technique.

At block 406, the method may involve the phone terminal 104 receiving and answering the sent phone call, thereby causing the sent phone call to become active. In one example, the phone terminal 104 answering the phone call may involve the operator lifting a handset of the phone terminal or pushing a button on a user interface of the phone terminal 104. Once the phone call is active, it may then be terminated. In one example, terminating the phone call may involve the operator hanging up the handset of the phone terminal 104 or pushing a button on the user interface of the phone terminal 104.

At block 408, the method may involve the phone switch 102 sending the corresponding caller data to the record manager 106. At block 410, the method may involve the record manager 106 receiving the sent caller data.

At block 412, the method may involve responsive to the record manager 106 receiving the sent caller data, the record manager 106 retrieving from the data storage 208, a school-administrator record corresponding to the received caller data. A school-administrator record may include a phone number (to match the caller data) and other data associated with a school administrator. In one example, a table or other data structure in the data storage 208 may provide a mapping of caller data to a school-administrator record. As such, in response to a school administrator calling the designated phone number from his office or mobile phone, the record manager 106 may automatically retrieve a corresponding school-administrator record for the school administrator.

A school-administrator record may also include a school record for a school that the school administrator is authorized to change the operational status of A school record may include a school identifier (e.g., a school name), a school phone number, and/or other school-related data associated with a school. As such, in one example when a principal of a school calls the designated phone number from his office or mobile phone, the record manager may 106 retrieve a school record for that principal's school. As another example, when a superintendent of a school district calls the designated phone number from his office or mobile phone, the phone server 106 may retrieve school records for all of the schools in the superintendent's district. These retrieved school records may be used for a variety of reasons such as those described in greater detail below.

A school-administrator record may also include administrator verification data that an operator may use to verify that a caller is who the caller purports to be. The operator's use of such administrator verification data is described in greater detail below.

Notably, the data described above in connection with school-administrator records and school records need not be organized in the particular manner described. As such, at block 412, the method may involve the record manager 106 retrieving any of the described data (e.g., a school identifier or administrator verification data) that corresponds to the received caller data.

At block 414, the method may involve responsive to the record manager 106 receiving the sent caller data, the record manager causing the notification system 110 to electronically disseminate a first message. The first message may indicate that an updated operational-status of a school identified by the retrieved school identifier is expected soon. This may be an explicit or implicit indication. For example, the first message may state "a phone call has been received from school ABC," "an update as to whether school ABC is closing today is expected shortly," and/or "stay tuned for a further update regarding school ABC."

In one example, the notification system 110 electronically disseminates the first message immediately after (or soon after) the corresponding phone call is received by the phone switch 102 and/or before the phone call is terminated. As such, in one example, the first message is disseminated contemporaneously while the sent phone call is active.

The record manager 106 may cause the notification system 110 to electronically disseminate the first message such as by sending an appropriate request or by updating a value in a table or other data structure in the data storage 308 that is monitored by the notification system 110. However, other techniques now know or later discovered that are used in connection with notification systems may also be used.

At block 416, the method may involve the phone switch 102 sending to the record manager 106, a phone-terminal identifier for the received phone call. The phone-terminal identifier indicates to which phone terminal 104 the phone switch 102 has sent (or will send) the received phone call. At block 418, the method may involve the record manager 106 receiving the sent phone-terminal identifier.

At block 420, the method may involve the record manager 106 determining a workstation terminal 108 that corresponds to the phone terminal 104. In one example, the workstation terminal 108 is determined based on the received phone-terminal identifier. A table or other data structure in the data storage 308 may provide a mapping of phone-terminal identifiers to corresponding workstation-terminal identifiers.

Recall that the school-administrator record retrieved by record manager 106 may include administrator verification data. As noted, this may be used by an operator to verify the identity of the caller. This may be particularly beneficial in instances where a caller has spoofed the called data corresponding to the caller's phone call (e.g., where a student makes it appear as though he is calling from his principal's phone). In one example, the administrator verification data may include facts such as the names of board members for a particular school, which the operator may request that the caller confirm to verify the caller's identify. In one example, if the caller stumbles or cannot confirm such facts, the operator may attempt to call the presumed school administrator at a phone number included in the school-administrator record to verify the caller's identity.

At block 422, the method may involve the record manager 106 sending to the determined workstation terminal 108, the retrieved administrator verification data. At block 424, the method may involve the workstation terminal 108 receiving the sent administrator verification data. At block 426, the method may involve the workstation terminal 108 displaying via its user interface the received administrator verification data for use by the operator. Displaying such data in this manner is sometimes referred to as a "screen pop."

At block 428, the method may involve the workstation terminal 108 receiving via its user interface (e.g., from the operator) an operational status of the school identified by the retrieved school identifier. This function may occur as a result of the school administrator providing the operational-status to the operator who in turn provides it to the workstation terminal via the user interface. As discussed above, an operational status may be open or closed. However, other types are possible. For example, a school may have an open with a delayed start time operational-status or an open with limited bus service operational-status.

At block 430, the method may involve the workstation terminal 108 sending to the record manager 106, the received operational-status. At block 432, the method may involve the record manager 106 receiving the sent operational-status. At block 434, the method may involve responsive to the record manager 106 receiving the sent operational-status, the record manager 106 electronically disseminating a second message.

The second message may indicate the received operational status of the school identified by the school identifier. Again, this indication may be explicit or implicit. For example, the second message may state "school ABC will be closed today," or "school ABC will open at 11:00 am today."

As discussed above, in some instances a message indicating the operational status of a school is disseminated only a short time before the scheduled start time of a school day, and intended recipients waiting to receive such a message may repeatedly check a news ticker, website, or other source. By disseminating the first message indicating that an updated operational-status of the school is expected soon, the intended recipients may be encouraged to stay alert such that they may receive the second message indicating the operational status of the school as soon as it is communicated by the school administrator and then disseminated. This may also provide advertising opportunities in connection with the first and second messages as intended recipients are likely to be particularly attentive around the times that these messages are disseminated.

IV. Example Variations

While examples have been provided in connection with a particular type of LBO, namely a school, the disclosed systems and methods are not so limited and may be adapted for use with any type of LBO, including for example, a business. Indeed, a business such as a manufacturing plant generally relies on the presence of employees to facilitate its operation of manufacturing goods. As with a school, typically a plant maintains a schedule indicating on which days the plant is expected to be open (commonly referred to as "work days"), and on which days the plant is expected to be closed. However, again, weather conditions may cause the plant to close, and therefore the plant may disseminate a business-closing message with the intent that targeted recipients (e.g., plant employees) refrain from traveling to the manufacturing plant.

While functions have been described as being performed by the certain devices (e.g., the record manager 106), the functions may be performed by any device, such as any of those included in the system 100. Further, the functions described throughout this disclosure need not be performed in the disclosed order. Also, not all functions need to be performed to achieve the desired advantages of the disclosed systems and methods, and therefore not all functions are required (i.e., other example methods may include any subset of the functions described herein).

While select example systems and methods have been described, other changes, substitutions, alterations, and permutations will be apparent to those of ordinary skill in the art without departing from the broader aspects as set forth in the following claims.

The invention claimed is:

1. A method comprising:
a phone switch receiving a phone call and corresponding caller data;
the phone switch sending to a record manager, the caller data;
the record manager receiving the sent caller data; and
responsive to the record manager receiving the sent caller data, the record manager (i) retrieving from a data storage, a school identifier corresponding to the received caller data, and (ii) causing a notification system to electronically disseminate a message, wherein the message indicates that an updated operational-status of a school identified by the retrieved school identifier is expected soon.

2. The method of claim 1, further comprising:
the phone switch sending to a phone terminal, the received phone call; and
the phone terminal receiving and answering the sent phone call, thereby causing the sent phone call to become active, wherein the record manager causing the notification system to electronically disseminate the message occurs contemporaneously while the sent phone call is active.

3. The method of claim 1, wherein the school identifier comprises a school name.

4. The method of claim 3, wherein the message indicates that a phone call has been received from a school identified by the school name.

5. The method of claim 3, wherein the message indicates that an updated closing-related operational-status of a school identified by the school name is expected soon.

6. The method of claim 1, wherein the received caller data comprises one of caller identification (caller ID) data and automatic number identification (ANI) data.

7. The method of claim 1, further comprising:
the record manager retrieving from the data storage, administrator verification data corresponding to the received caller data;
the record manager determining a workstation terminal that corresponds to a phone terminal that received the phone call from the phone switch; and
the record manager sending to the determined workstation, the retrieved school identifier and the retrieved administrator verification data.

8. The method of claim 7, wherein the message is a first message, the method further comprising:
the workstation terminal receiving the sent school identifier and the sent administrator verification data;
the workstation terminal displaying via a user interface, the received school identifier and the retrieved administrator verification data;
the workstation terminal receiving via the user interface, an operational-status of a school identified by the received school identifier;
the workstation terminal sending to the record manager, the received operational-status;
the record manager receiving the sent operational-status; and
responsive to the record manager receiving the sent operational-status, the record manager causing the notification system to electronically disseminate a second message, wherein the second message indicates the received operational status of the school identified by the retrieved school identifier.

9. A method comprising:
receiving caller data corresponding to a phone call; and
responsive to receiving the caller data, (i) retrieving from a data storage, a school identifier corresponding to the received caller data, and (ii) causing a notification system to electronically disseminate a message, wherein the message indicates that an updated operational-status of a school identified by the retrieved school identifier is expected soon.

10. The method of claim 9, wherein causing the notification system to electronically disseminate the message occurs contemporaneously while the phone call is active.

11. The method of claim 9, wherein the school identifier comprises a school name.

12. The method of claim 11, wherein the message indicates that a phone call has been received from a school identified by the school name.

13. The method of claim 12, wherein the message indicates that an updated closing-related operational-status update of a school identified by the school name is expected soon.

14. The method of claim 12, wherein the caller data comprises one of caller identification (caller ID) data and automatic number identification (ANI) data.

15. The method of claim 9, further comprising:
   receiving administrator verification data corresponding to the received caller data;
   determining a workstation terminal that corresponds to a phone terminal that received the phone call; and
   sending to the determined workstation, the retrieved school identifier and the retrieved administrator verification data.

16. The method of claim 15, wherein the message is a first message, the method further comprising:
   receiving an operational status of a school identified by the retrieved school identifier; and
   responsive to receiving the operational status, causing the notification system to electronically disseminate a second message, wherein the second message indicates the received operational-status of the school identified by the retrieved school identifier.

17. A system comprising:
   a phone switch; and
   a record manager having a data storage, wherein the record manager is connected to the phone switch and to a notification system,
   wherein the phone switch is configured for: (i) receiving a phone call and corresponding caller data, and (ii) sending the caller data to the record manager, and
   wherein the record manager is configured for: (i) receiving the sent caller data, and (ii) responsive to the record manager receiving the sent caller data, (a) retrieving from the data storage, a location-based organization (LBO) identifier corresponding to the received caller data, and (b) causing the notification system to electronically disseminate a message.

18. The system of claim 17, wherein the LBO identifier comprises a school identifier.

19. The system of claim 17, wherein the LBO identifier comprises a business identifier.

20. The system of claim 17, wherein causing the notification system to electronically disseminate the message occurs contemporaneously while the phone call is active.

* * * * *